United States Patent Office 2,716,949
Patented Sept. 6, 1955

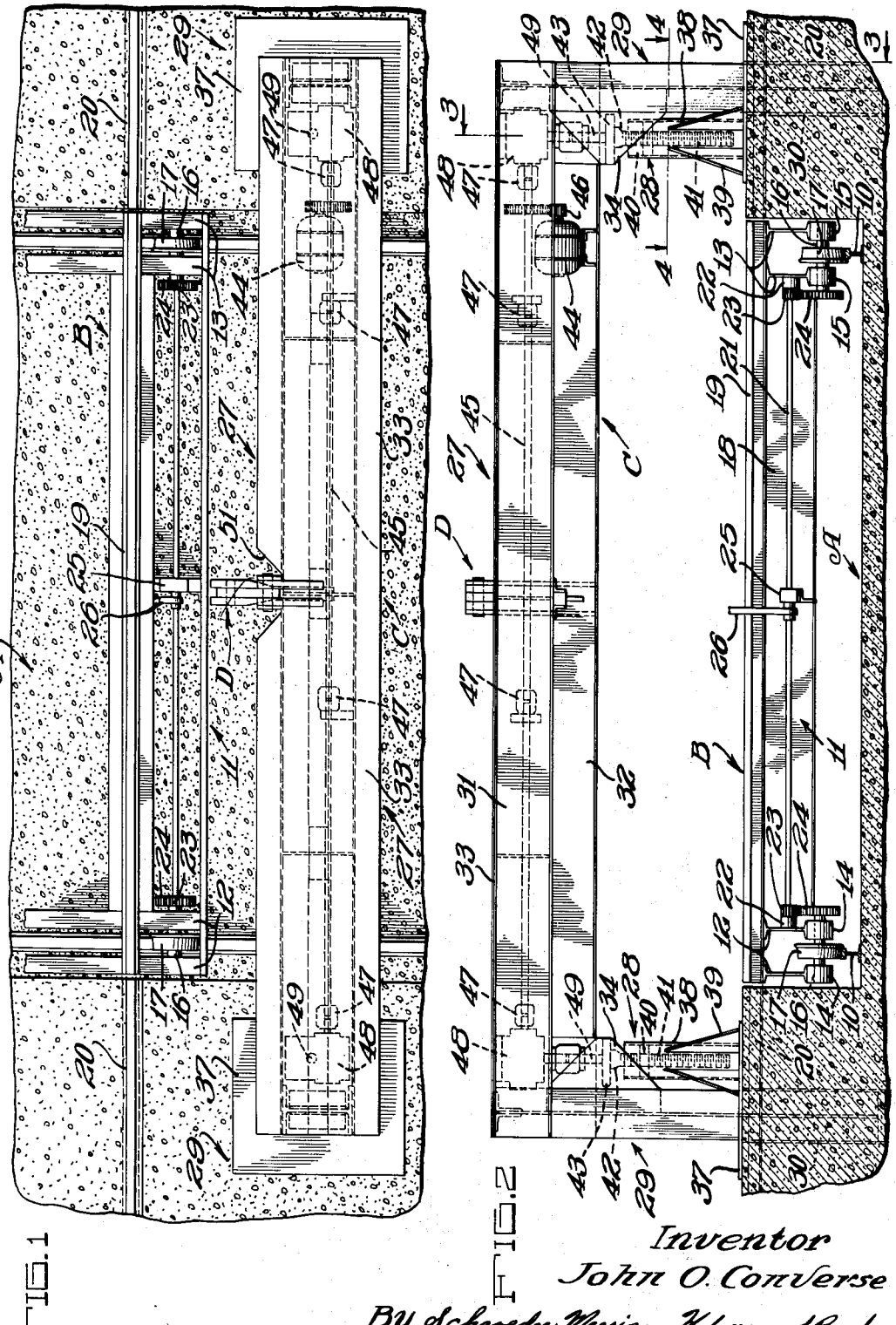

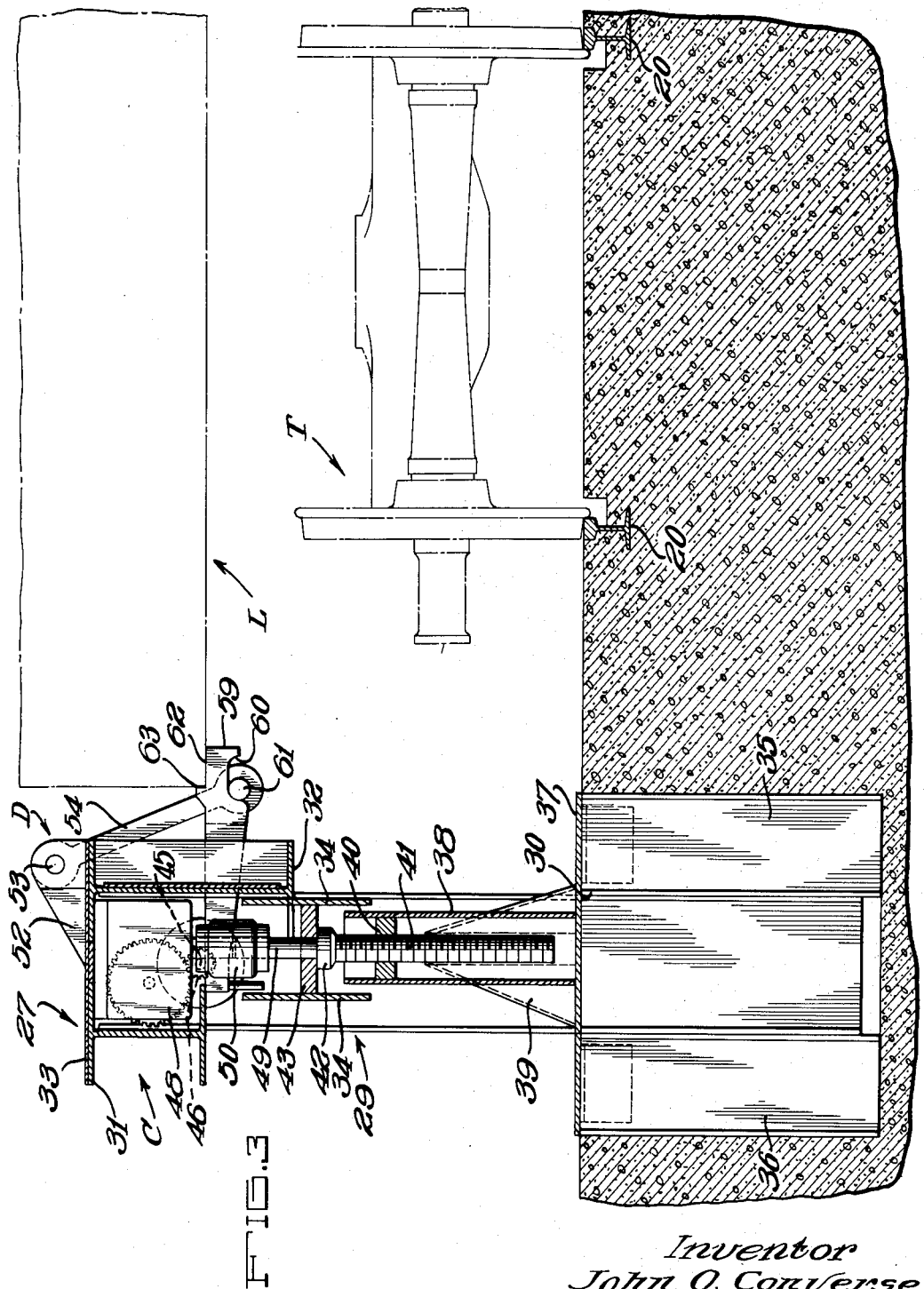

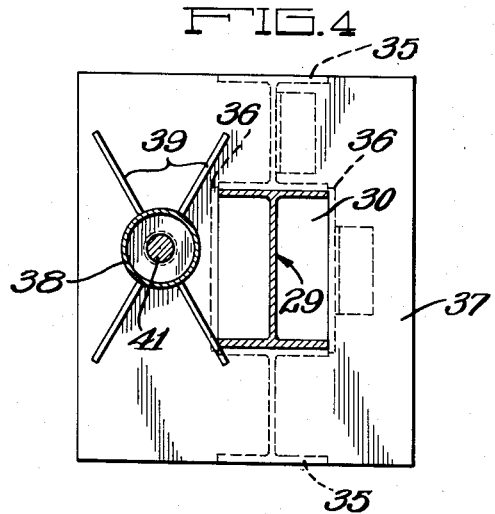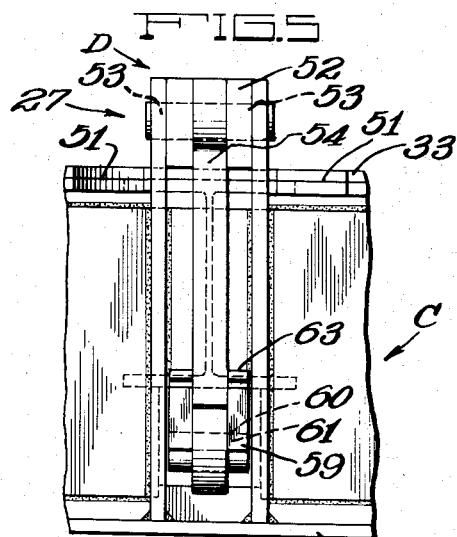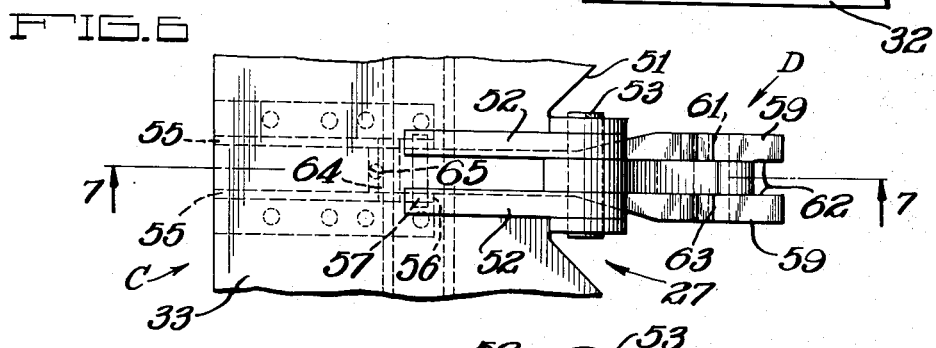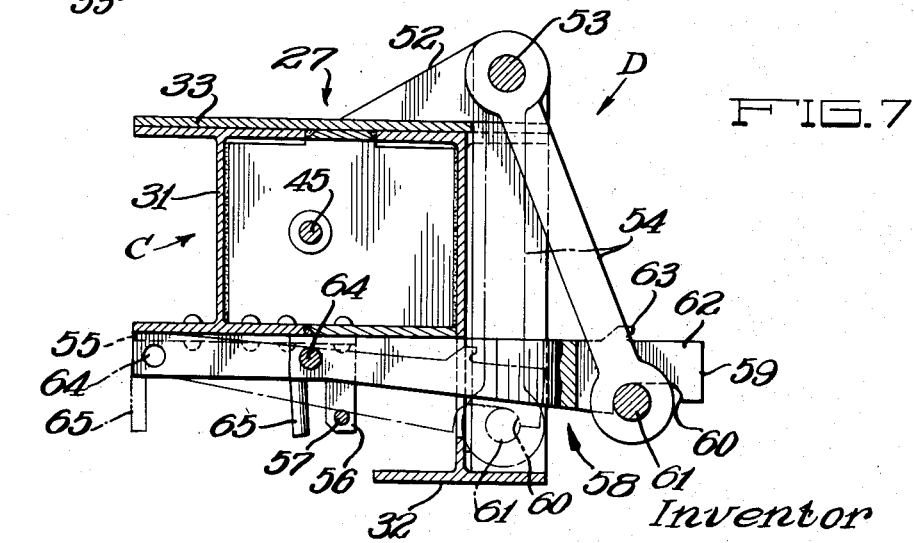

2,716,949

APPARATUS FOR SERVICING VEHICLES HAVING A BODY AND A REMOVABLE UNDERCARRIAGE

John O. Converse, Minneapolis, Minn., assignor to Nichols Engineering Company, an Illinois corporation Application January 17, 1951, Serial No. 206,476

15 Claims. (Cl. 104—32)

This invention relates in general to an improved mechanism for removing, for servicing, the trucks or undercarriage of railway rolling stock or similar vehicles, especially those of diesel locomotives and, in particular, relates to a mechanism of that character which includes a transfer table positionable beneath a vehicle to receive a truck or undercarriage and thereafter movable to one side of the vehicle.

The principal object of the invention is to provide a rugged, relatively inexpensive, and convenient mechanism for removing a truck from a railway car or locomotive.

Another object is to provide a mechanism of the character described having rolling stock lifting means of such character that a shallow pit only is required for the transfer table, obviating the necessity for deep pits and transfer table raising and lowering mechanisms inherent to deep-pit constructions.

A further object is to provide a mechanism which lifts one end of a diesel locomotive or other railway rolling stock so that a truck detached therefrom may be removed from beneath the locomotive on a transfer table rolling on rails in a shallow pit.

Another object is to provide a mechanism in which the top of the transfer table is vertically stationary so as to remain flush with the top margins of the pit at all times, thus facilitating removal of a truck from the table, or servicing of a truck on the table.

Yet a further object is to provide a locomotive hoist in which a pair of lifting beams span a shallow pit and are provided with upright columns which extend into close fitting wells to give lateral stability to the beams, and the beams are elevated by supporting screws located close adjacent the columns.

Still another object is to provide a mechanism in which the locomotive or car may be rolled between flanking lifting beams, and extensible arms on said beams may be slid beneath the locomotive or car body to support and elevate one end of it with the beams.

Yet another object is to provide a mechanism in which the relatively light and compact transfer table requires no elevating mechanism, and the heavy elevating mechanism is outside the pit.

For convenience of terminology, hereafter the term "diesel locomotive" will be employed in the specification as a typical example of railway rolling stock which might be handled by this mechanism; without in any way limiting its field of use to diesel locomotives.

Other objects and advantages will become apparent from a description of a preferred embodiment of the invention as illustrated in the accompanying drawings in which:

Fig. 1 is a fragmentary plan view of a mechanism embodying the invention, there being shown only one lifting beam of a pair and a part of a transfer table;

Fig. 2 is a side elevation thereof with the pit shown in cross section;

Fig. 3 is an enlarged section taken as indicated along the line 3—3 of Fig. 2, with portions of a vehicle body and truck schematically illustrated in broken lines with the supporting mechanism in lifting position and with connections between the vehicle and truck eliminated for clarity;

Fig. 4 is an enlarged section taken as indicated along the line 4—4 of Fig. 2;

Fig. 5 is a fragmentary front elevational view of one of the beams, showing the locomotive lifting arm in detail;

Fig. 6 is a top plan view similar to Fig. 5; and

Fig. 7 is a section taken as indicated along the line 7—7 of Fig. 6.

While the invention is susceptible of various modifications and alternative constructions it is herein shown, and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

The invention comprises generally four principal parts, namely, a pit A extending transversely of rails on which the rolling stock is brought to the mechanism, a transfer table B located and operable in the pit to receive a truck and transport the same to some remote location for repair or replacement and vice versa, two lifting beams C spanning the pit and operable to lift the rolling stock clear of a truck resting on the transfer table, and a vehicle supporting mechanism D on each lifting beam.

Referring to the drawings in greater detail, a service shop for railway rolling stock, such as diesel locomotives, is provided with approach rails 20 which are intersected by the shallow, transverse pit A. The body of the pit and the surrounding floor ordinarily are concrete, and the pit has rails 10 extending along its bottom. The pit is made only deep enough to receive the transfer table B which is quite low due to the fact that it has a fixed platform. A pit depth of 24 to 28 inches is ample.

The transfer table B has a frame, indicated generally at 11, consisting of I beams 12 and 13 which are provided with roller bearing assemblies 14 and 15 to receive axles 16 for the wheels 17. Stringers 18 extend between the I beams 12 and 13 to complete the frame, and the frame includes suitable braces to give it rigidity. Rails 19 are supported on the stringers 18, and are so spaced that when the transfer table B is properly located in the pit A they form a continuation of the approach rails 20 which are set in the shop floor.

Thus, with the transfer table B in the position shown in Fig. 1 a diesel locomotive may be moved in on the rails 20 until one of its trucks is on the transfer table, which is of sufficient width to accommodate the truck.

In order to move the transfer table B along the pit A on the rails 10, it is provided with a transverse drive rod 21 which is journalled at 22 and has gears 23 which mesh with gears 24 on the axles 16. A ratchet 25 at the center of the drive rod 21 is provided with a ratchet hand lever 26 so that a workman may propel the transfer table B by hand along the pit tracks 10.

As best seen in Fig. 2, the lifting beams C consist generally of main pit spanning beams 27 supported on screw jacks 28 and provided with stabilizing columns 29 extending into wells 30 adjacent the pit A to provide lateral stability for the lifting beams C. Driving mechanism for the screw jacks is carried on each lifting beam C, as will be more fully described hereinafter.

Inasmuch as there are two identical lifting beams C flanking the approach rails 20, only one will be described in detail. As best seen in Figs. 3 and 7, the main pit spanning beams 27 consist of a fabricated structure, here shown as a pair of I beams 31 and 32, welded or riveted together to provide a unitary structure, and having suitable reinforcing members. The main beams 27 span the pit A at a distance from the approach rails 20 such that a diesel locomotive L, the body of which is indicated fragmentarily in interrupted lines in Fig. 3, may run between them with adequate clearance on both sides. A truck T is shown on the approach rails 20. A deck plate 33 extends along the top of the main beam 27 to provide a walkway for the convenience of workmen servicing the body of the locomotive.

At its ends the main beam 27 is welded or riveted to the upright stabilizing columns 29 which, as seen in Fig. 4, preferably consist of I beams extending downwardly into the wells 30 formed in the pit floor. The columns 29 and main beam 27 have structural strengthening brackets 34. The wells 30 are preferably formed of a pair of spaced I beams 35 which have plates 36 welded to their adjacent edges to form a rectangular upright box. Base plates 37 cover the exposed ends of the I beams 35 and serve to distribute the weight of the lifting beam C over a substantial area of floor and throw some of the thrust thereof onto said I beams; inasmuch as the lifting jacks 28 which carry the weight of the beam are supported on said base plates 37. Each lifting jack 28 comprises a main column 38 having integral bracing members 39 welded to the base plate 37. A bronze nut 40 at the top of the column 38 is threaded to receive a jack screw 41 which thus may be rotated to move it vertically within the column 38. A roller thrust bearing 42 at the top of each jack screw 41 is positioned beneath an integral structural supporting element 43 of the lifting beam C, so that rotation of the jack screw 41 will cause vertical motion of the lifting beam C. As best seen in Fig. 3, the jack screw 41 is offset inwardly from the center line of the main beam 27 so as to reduce the strain on the jack mechanism when the beams C are supporting a locomotive.

Raising and lowering of the lifting beam C is effected by means of an electric motor 44 mounted within the web of the main beam 27, and operatively connected to a drive shaft 45 through gears or a friction drive 46. The drive shaft 45 extends the entire length of the main beam 27, and is journalled at suitable intervals in journal boxes 47. The drive shaft 45 operates through a pair of reduction gear boxes 48 and connecting shafts 49 in journal boxes 50 to simultaneously rotate the two jack screws 41 at each end of a lifting beam C. The motors 44 on the pair of lifting beams C may be simultaneously started and stopped by means of a single electric control box (not shown) in a manner which is well known.

As best seen in Figs. 5 to 7, the supporting mechanism D is extensible and retractable, and is positioned centrally of the main beam 27 in a recess 51 so that when it is retracted no part of it extends beyond the inner longitudinal edge of the main beam. Two spaced brackets 52 which project over the recess 51 and down the web of beam 32 to its bottom flange are apertured to receive a pin 53 on which is pivoted a link 54. A pair of spaced angle members 55 are secured on the bottom of the I beam 31 and have downwardly extending fingers 56 to receive a fixed pin 57 which serves as a rear support for a slidable support arm 58 when the arm is in its retracted position. The front of the support arm 58 is bifurcated to provide two fingers 59 which flank the link 54 and have recesses 60 in their lower surfaces which slidingly engage a projecting pin 61 on the link 54 to support the front of the arm 58. Fig. 7 shows the supporting mechanism D in full lines in its extreme extended supporting position, and in broken lines in its extreme retracted position, from which it is seen that the extreme outer end of the support arm 58 is flush with the inner face of the main beam 27 in retracted position. The recess 60 permits relative movement between the arm 58 and the link 54 so that the outer extremity of the arm is flush with the front of the link in retracted position, but extends substantially therebeyond in extended position so that flat tops 62 of the fingers 59 may engage beneath a locomotive body. Stop lugs 63 abut against the body to prevent excessive outward movement of the arm 58. The pin 57 supports the rear of the arm 58 only when the arm is retracted. When the arm 58 is extended its rear end is raised until its top bears against the bottom of the I beam 31 and is held by a removable pin 64 which extends through the angle members 55 and the arm 58. When the arms are not under load they may be readily manipulated by means of handles 65.

When the mechanism is to be used for removing a diesel locomotive truck, the lifting beams C are placed in their lowest position, and the supporting mechanism D on each lifting beam is placed in its retracted position with the outer end of the arm 58 flush with the inner face of the main beam 27. The transfer table B is positioned on the rails 10 of the pit A so that its rails 19 form a continuous track with the approach rails 20, spanning the pit, and is then locked in place by conventional means (not shown). A locomotive is run in on the approach rails 20 until the truck to be removed is positioned on the rails 19 of the transfer table B. This places the locomotive body between, and in close proximity to, the lifting beams C which flank the approach rails and span the pit A. Each supporting mechanism D is then moved from its retracted position to its extended position with the fingers 59 beneath the locomotive body by a workman who uses the handles 65 at the rear of each of the supporting arms 58 to slide the arms forward until the apertures in the angle members 55 and the arms 58 are in register to receive the removable pin 64. When the arms 58 are properly positioned beneath the locomotive body, the operator may press a single control button (not shown) to energize the two electric motors 44 in the lifting beams C in order to elevate the lifting beams and raise the end of the locomotive from its truck, which has, of course, first been detached from the locomotive body. When the lifting beams have reached a sufficient height to give clearance between the truck and the locomotive body, the operator may then cut off power to the motors 44. The transfer table B is unlocked, and by manipulation of the ratchet hand lever 26 the transfer table B is moved along the rails 10 to carry the truck laterally from beneath the locomotive.

When a truck is to be replaced upon a locomotive, the above procedure is, of course, simply reversed to first bring the truck into position beneath the locomotive body which is supported by the mechanism D and lifting beams C, and then lower the body onto the truck by means of the motors 44 and lifting jacks 28.

I claim:

1. Mechanism for servicing a vehicle having a body and removable undercarriage, comprising: a shallow pit; supporting means movable longitudinally in said pit, said supporting means having a fixed platform level with the top of the pit to receive a vehicle undercarriage; a pair of vertically movable lifting beams spanning said pit and spaced apart to receive a vehicle between them with part of the undercarriage on said movable supporting means; means for simultaneously moving said beams vertically; and vehicle supporting means on each of said beams positioned to extend beneath the body of a vehicle located between said beams.

2. Mechanism for servicing a vehicle having a body and a removable undercarriage, comprising: an undercarriage supporting and transporting means having a fixed platform provided with an undercarriage receiving track disposed at the level of approach of the vehicle, a pair of vertically movable lifting beams extending parallel with the track on said supporting and transporting means and spaced apart to receive a vehicle therebetween with part of the undercarriage on said supporting means, means for simultaneously moving said beams vertically, and vehicle supporting means on each of said beams to engage with the vehicle body so as to move the same vertically relative to its undercarriage.

3. Mechanism for servicing a railway vehicle having a body and a removable undercarriage, comprising: a shallow pit; a transfer table movable longitudinally of said pit and provided with a fixed platform having transversely extending rails disposed at the level of approach of a vehicle to receive part of a vehicle undercarriage; a pair of lifting beams spanning said pit at an equal height and spaced apart to receive a vehicle between them with part of its undercarriage on said transfer table, said beams having upright stabilizing columns extending into wells; a plurality of rotatable screw supports for each of said beams; mechanism for simultaneously rotating said screw supports to move said beams vertically in unison; and a vehicle supporting arm on each lifting beam, each supporting arm being movable between a retracted position with its inner end substantially flush with the inner face of the beam and a lifting position projecting beneath the body of a vehicle located between said beams.

4. Mechanism for servicing a railway vehicle having a body and a removable undercarriage, comprising: a shallow pit; a transfer table movable longitudinally of said pit and provided with a fixed platform having transversely extending rails disposed at the level of approach of a vehicle to receive part of the undercarriage of a vehicle; a pair of lifting beams spanning said pit at an equal height and spaced apart to receive a vehicle between them with part of its undercarriage on said transfer table; an integral upright stabilizing column at each end of each of said beams, each of said stabilizing columns extending into a closely fitting well in the floor adjacent the pit to provide lateral stability for said beams; a screw support for said beams adjacent each stabilizing column, said screw supports being positioned inwardly of the longitudinal center line of the beams; mechanism for simultaneously rotating said screw supports to move said beams vertically in unison; and inwardly extensible vehicle supporting means on each beam.

5. Mechanism for servicing a railway vehicle having a body and a removable undercarriage, comprising: a shallow pit; a transfer table movable longitudinally of said pit, and provided with a fixed platform having transversely extending rails disposed at the level of approach of a vehicle to receive part of the undercarriage of a vehicle; a pair of lifting beams spanning said pit at an equal height and spaced apart to receive a vehicle between them with part of its undercarriage on said transfer table; an integral upright stabilizing column at each end of each of said beams, each of said stabilizing columns extending into a closely fitting well in the floor adjacent the pit to provide lateral stability for said beams, a screw support for said beams adjacent each stabilizing column; mechanism for simultaneously rotating said screw supports to move said beams vertically in unison; and a vehicle supporting arm on each lifting beam, each supporting arm being movable between a retracted position with its inner end substantially flush with the inner face of the beam and a lifting position projecting beneath the body of a vehicle located between said beams.

6. Mechanism for servicing a railway vehicle having a body and removable undercarriage, comprising: a shallow pit; a transfer table movable longitudinally of said pit and provided with a fixed platform having transversely extending rails disposed at the level of approach of a vehicle to receive part of a vehicle undercarriage; a pair of lifting beams spanning said pit at an equal height and spaced apart to receive a vehicle between them with one of its trucks on said transfer table, said beams having upright stabilizing columns extending into wells; a plurality of vertically movable supports for each of said beams; mechanism for simultaneously moving supports vertically to move said beams vertically in unison; and inwardly extensible vehicle supporting means on each beam.

7. A vehicle hoist for use in combination with a shallow pit transfer table of the character described, comprising: a pair of lifting beams spanning said pit at an equal height and spaced apart to receive a vehicle between them with one of its trucks on said transfer table, said beams having upright stabilizing columns extending into wells; a plurality of vertically movable supports for each of said beams; mechanism for simultaneously moving said supports vertically to move said beams vertically in unison; and inwardly extensible vehicle supporting means on each beam.

8. A vehicle hoist for use in combination with a shallow pit transfer table of the character described, comprising: a pair of lifting beams spanning said pit at an equal height and spaced apart to receive a vehicle between them with one of its trucks on a transfer table; an integral upright stabilizing column at each end of each of said beams, each of said stabilizing columns extending into a closely fitting well in the floor adjacent the pit to provide lateral stability for said beams; a screw support for said beams adjacent each stabilizing column; mechanism for simultaneously rotating said screw supports to move said beams vertically in unison; and inwardly extensible vehicle supporting means on each beam.

9. A vehicle hoist for use in combination with a shallow pit transfer table of the character described, comprising: a pair of lifting beams spanning said pit at an equal height and spaced apart to receive a vehicle between them with one of its trucks on said transfer table; an integral upright stabilizing column at each end of each of said beams, each of said stabilizing columns extending into a closely fitting well in the floor adjacent the pit to provide lateral stability for said beams, a screw support for said beams adjacent each stabilizing column; mechanism for simultaneously rotating said screw supports to move said beams vertically in unison; and a vehicle supporting arm on each lifting beam, each supporting arm being movable between a retracted position with its inner end substantially flush with the inner face of the beam and a lifting position projecting beneath the body of a vehicle located between said beams.

10. A vehicle hoist for use in combination with a shallow pit transfer table of the character described, comprising: a pair of lifting beams spanning said pit at an equal height and spaced apart to receive a vehicle between them with one of its trucks on a transfer table, said beams being of sufficient width to act as platforms for working on the vehicle body and having upright stabilizing columns extending into wells; a plurality of vertically movable supports for said beams; mechanism for simultaneously moving said supports vertically in unison; and inwardly extensible vehicle supporting means on each beam.

11. A vehicle hoist for use in combination with a shallow pit transfer table of the character described, comprising: a pair of lifting beams spanning said pit at an equal height; a plurality of rotatable screw supports for each beam; mechanism for simultaneously rotating said screw supports to move said beams vertically in unison; and a retractable locomotive supporting member on each lifting beam, each of said members comprising a generally upright link pivoted on the beam, and a slidable arm having its rear end supported by the beam and its front end slidingly supported by the link.

12. A vehicle hoist for use in combination with a shallow pit transfer table of the character described, comprising: a pair of lifting beams spanning said pit at an equal height; a plurality of rotatable screw supports for each beam; mechanism for simultaneously rotating said screw supports to move said beams vertically in unison; and a retractable vehicle supporting member on each lifting beam, each of said members comprising a link pivoted adjacent the top of the beam and having projecting lugs at its lower end, and a sliding arm adjacent the bottom of the beam with its rear end supported by the beam and its front end bifurcated so as to span the lower end of the link and engage said projecting lugs thereon.

13. A hoist according to claim 12 wherein the bifurcated front end of the arm has elongated recesses in its lower surface to engage the projecting lugs on the link and slidingly support the front end of the arm on said lugs.

14. In a vehicle hoist including a pair of lifting beams spaced apart to receive one end of a vehicle between them, vehicle supporting mechanism comprising: a generally upright link pivoted on one of said beams; and a horizontally slidable support arm having its rear end supported by the beam and its front end slidingly supported by the link.

15. In a vehicle hoist including a pair of lifting beams spaced apart to receive one end of a vehicle between them, vehicle supporting mechanism on each beam comprising: a link pivoted adjacent the top of the beam and having projecting lugs adjacent its lower end, and a horizontally sliding arm adjacent the bottom of the beam with its rear end supported by the beam and its front end bifurcated so as to span the lower end of the link, said bifurcated front end having elongated recesses in its lower surface to engage the projecting lugs on the link to slidingly support the front end of the arm on said lugs.

References Cited in the file of this patent

UNITED STATES PATENTS

| | | |
|---|---|---|
| 152,873 | Skinner et al. | July 7, 1874 |
| 761,815 | Blumhoefer | June 7, 1904 |
| 1,102,232 | Benedict | July 7, 1914 |
| 1,554,120 | Mosher | Sept. 15, 1925 |
| 2,069,236 | Fitch | Feb. 2, 1937 |
| 2,454,225 | Skinner | Nov. 16, 1948 |